(12) United States Patent
Herman

(10) Patent No.: US 8,907,919 B2
(45) Date of Patent: Dec. 9, 2014

(54) SENSING STRUCTURE OF TOUCH PANEL

(75) Inventor: Herman, Hsinchu County (TW)

(73) Assignee: Sitronix Technology Corp., Hsinchu Coutny (TW)

(*) Notice: Subject to any disclaimer, the term of this patent is extended or adjusted under 35 U.S.C. 154(b) by 60 days.

(21) Appl. No.: 13/430,981

(22) Filed: Mar. 27, 2012

(65) Prior Publication Data
US 2012/0256873 A1 Oct. 11, 2012

Related U.S. Application Data

(60) Provisional application No. 61/472,257, filed on Apr. 6, 2011.

(51) Int. Cl.
*G06F 3/044* (2006.01)

(52) U.S. Cl.
USPC .......................................................... 345/174

(58) Field of Classification Search
CPC .......... G06F 3/044; G06F 2203/04112; H03K 2017/9602; H03K 2017/9604; H03K 17/962
USPC .......................................................... 345/174
See application file for complete search history.

(56) References Cited

U.S. PATENT DOCUMENTS

| | | | | |
|---|---|---|---|---|
| 6,297,811 B1 * | 10/2001 | Kent et al. | ...................... | 345/173 |
| 7,808,255 B2 * | 10/2010 | Hristov et al. | ................ | 324/686 |
| 7,864,160 B2 * | 1/2011 | Geaghan et al. | .............. | 345/173 |
| 8,279,194 B2 * | 10/2012 | Kent et al. | ...................... | 345/174 |
| 8,415,959 B2 * | 4/2013 | Badaye | .......................... | 324/658 |
| 8,456,443 B2 * | 6/2013 | Bulea et al. | .................... | 345/174 |
| 8,564,552 B2 * | 10/2013 | Yilmaz | .......................... | 345/173 |
| 2005/0270039 A1 * | 12/2005 | Mackey | ......................... | 324/660 |
| 2007/0008299 A1 * | 1/2007 | Hristov | .......................... | 345/173 |
| 2007/0247443 A1 * | 10/2007 | Philipp | .......................... | 345/173 |
| 2007/0257894 A1 * | 11/2007 | Philipp | .......................... | 345/173 |
| 2007/0279395 A1 * | 12/2007 | Philipp et al. | .................. | 345/173 |
| 2008/0074398 A1 * | 3/2008 | Wright | ............................ | 345/173 |
| 2009/0073135 A1 * | 3/2009 | Lin et al. | ........................ | 345/173 |
| 2011/0193791 A1 * | 8/2011 | Tong et al. | ...................... | 345/173 |
| 2012/0001863 A1 * | 1/2012 | Kim et al. | ....................... | 345/174 |
| 2012/0227259 A1 * | 9/2012 | Badaye et al. | .................. | 29/846 |

* cited by examiner

*Primary Examiner* — Dwayne Bost
*Assistant Examiner* — Ivelisse Martinez Quiles
(74) *Attorney, Agent, or Firm* — Rosenberg, Klein & Lee

(57) ABSTRACT

The present invention relates to a sensing structure of touch panel, which comprises a plurality of first electrode groups are located on a first side of a substrate. The bottom of each first electrode is located on the first side and extends towards a second side. A plurality of extended electrode groups are connected to the plurality of first electrode groups, respectively. The bottom of each extended electrode is located on the second side and extends towards the first side. The plurality of second electrode groups are located on the substrate. A first sub-electrode of each second electrode is interleaved with and insulated electrically from each extended electrode. The plurality of third electrode groups are located on the substrate and have a plurality of third electrodes. A first sub-electrode of the third electrode is interleaved with and insulated electrically from the second sub-electrode of the second electrode.

6 Claims, 3 Drawing Sheets

SENSING STRUCTURE OF TOUCH PANEL

REFERENCE TO RELATED APPLICATIONS

This Application is based on Provisional Patent Application Ser. No. 61/472,257, filed 6 Apr. 2011, currently pending.

FIELD OF THE INVENTION

The present invention relates generally to a sensing structure, and particularly to a sensing structure of touch panel.

BACKGROUND OF THE INVENTION

In recent years, various electronic products are developing continuously towards the direction of friendly operations, small sizes, and large displays. In particular, portable electronic products are especially demanding for their volume and display size. Thereby, many electronic products integrates touch panel and LCD panel for eliminating keyboard or saving the space required for operating keys, and thus extending the usable area of displays.

Depending on their sensing principles, general touch panels can be classified into resistive, capacitive, infrared, and ultrasonic types. Thanks to their dust and scrape resistant properties as well as the advantage of high resolution, capacitive touch panels are adopted increasingly in electronic devices.

The principle of a capacitive touch panel is mainly to plate the surface of a glass substrate with a layer of transparent conductive thin film, such as indium-tin oxides, as the sensing structure. When a user touches the panel using his finger, the proximity of the finger changes the coupling capacitance of the sensing structure. The capacitive touch panel can analyze changes in capacitance of the sensing structure and thus determining the touch location of the finger.

FIG. 1 shows a schematic diagram of the electrode structure of a projected capacitive touch sensor according to the prior art. As shown in the figure, the projected capacitive touch sensor adopts two electrode layers to fabricate the electrodes for facilitating scanning of the circuit. The electrode structure according to the prior art mainly comprises a substrate (not shown in the figure), a Y-axis electrode layer 20', and an X-axis electrode layer 10'. The substrate, for example, is a glass substrate. The Y-axis electrode layer 20' is disposed on the top surface of the glass substrate, and has multiple Y-axis electrodes (y1, y2, y3, y4 . . .) spaced by a fixed spacing. The X-axis electrode layer 10' is disposed on the bottom surface of the glass substrate, and has multiple X-axis electrodes (x1, x2, x3, x4 . . .) spaced by a fixed spacing and perpendicular to the Y-axis electrodes. Thereby, when a finger touches or approaches the glass substrate, the capacitance of the X- and Y-axis electrodes at the touched location changes. By using a detecting circuit, the X- and Y-axis coordinate data can be detected.

For using this dual-layer capacitive touch sensor, it is required to dispose X- and Y-axis electrodes on the top and bottom surfaces of the glass substrate, respectively. In general, indium-tin oxides are used for fabricating transparent electrodes, which makes the manufacturing cost high. For solving the problem of the dual-layer capacitive touch sensor, a single-layer capacitive touch sensor is developed. Nonetheless, current single-layer capacitive touch sensor still needs to be improved in multi-touch applications.

Accordingly, the present invention provides a novel sensing structure of touch panel, which can give the touched location on the touch panel accurately without increasing wires. In addition, the area of the touch panel is also reduced.

SUMMARY

An objective of the present invention is to provide a sensing structure of touch panel. Thereby, without increasing wires, a touch panel can give a touched location thereon accurately.

Another objective of the present invention is to provide a sensing structure of touch panel, which uses a plurality of wires disposed on the same side of a substrate for reducing wiring area, and hence reducing the area of a touch panel.

The sensing structure of touch panel according to the present invention comprises a substrate, a plurality of first electrode groups, a plurality of extended electrode groups, a plurality of second electrode groups, and a plurality of third electrode groups. The substrate has a first side and a second side opposite to each other. The plurality of first electrode groups are located on the first side of the substrate. Each first electrode group includes a plurality of first electrodes. The bottom of each first electrode is located on the first side and extends towards the second side. The plurality of extended electrode groups are connected to the plurality of first electrode groups, respectively, and located on the second side of the substrate. The plurality of extended electrode groups are opposite to the plurality of first electrode groups. Each extended group has a plurality of extended electrodes. The bottom of each extended electrode is located on the second side and extends towards the first side. The plurality of second electrode groups are located on the substrate and have a plurality of second electrodes. Each second electrode has a first sub-electrode and a second sub-electrode. The first sub-electrode of each second electrode is interleaved with and insulated electrically from each extended electrode. The plurality of third electrode groups are located on the substrate and have a plurality of third electrodes. Each third electrode has a first sub-electrode and a second sub-electrode. The first sub-electrode of the third electrode is interleaved with and insulated electrically from the second sub-electrode of the second electrode. In addition, the second sub-electrode of the third electrode is interleaved with and insulated electrically from the first electrode. Thereby, without increasing wires, the sensing structure of touch panel according to the present invention can give a touched location thereon accurately.

Furthermore, another sensing structure of touch panel according to the present invention comprises a substrate, a plurality of first electrode groups, a plurality of first wires, a plurality of second electrode groups, a plurality of second wires, a plurality of third electrode groups, and a plurality of third wires. The substrate has a first side and a second side opposite to each other. The plurality of first electrode groups are located on the first side of the substrate. Each first electrode group includes a plurality of first electrodes. The bottom of each first electrode is located on the first side and extends towards the second side. The plurality of first wires are connected electrically with the plurality of first electrodes of each first electrode group, respectively. The plurality of second electrode groups are located on the second side of the substrate. Each second electrode group includes a plurality of second electrodes. The bottom of each second electrode is located on the second side and extends towards the first side. The plurality of second wires are connected electrically with the plurality of second electrodes of each second electrode group, respectively. The plurality of third electrode groups are located on the substrate and has a plurality of third electrodes. Each third electrode has a first sub-electrode and a second sub-electrode. The first sub-electrode of the third electrode is interleaved with and insulated electrically from the second electrode; the second sub-electrode of the third electrode is interleaved with and insulated electrically from the first electrode. The plurality of third wires are connected electrically with the plurality of third electrodes of each third electrode group, respectively. The plurality of first wires, the plurality of second wires, and the plurality of third wires are all located on the same side of the substrate for reducing wiring area, and thus reducing the area of the touch panel.

DETAILED DESCRIPTION

In order to make the structure and characteristics as well as the effectiveness of the present invention to be further understood and recognized, the detailed description of the present invention is provided as follows along with embodiments and accompanying figures.

Figure 1:
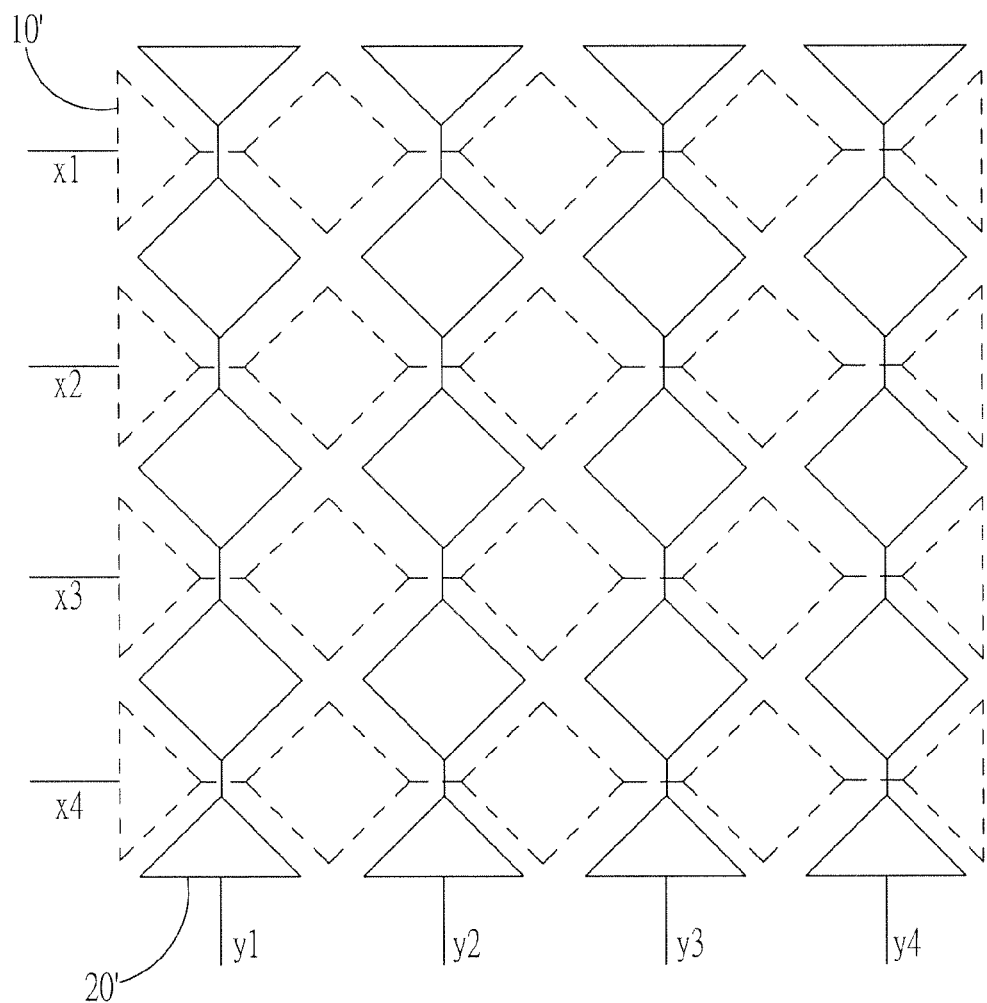
FIG. 1 shows a schematic diagram of the electrode structure of a projected capacitive touch sensor according to the prior art.
Figure 2:
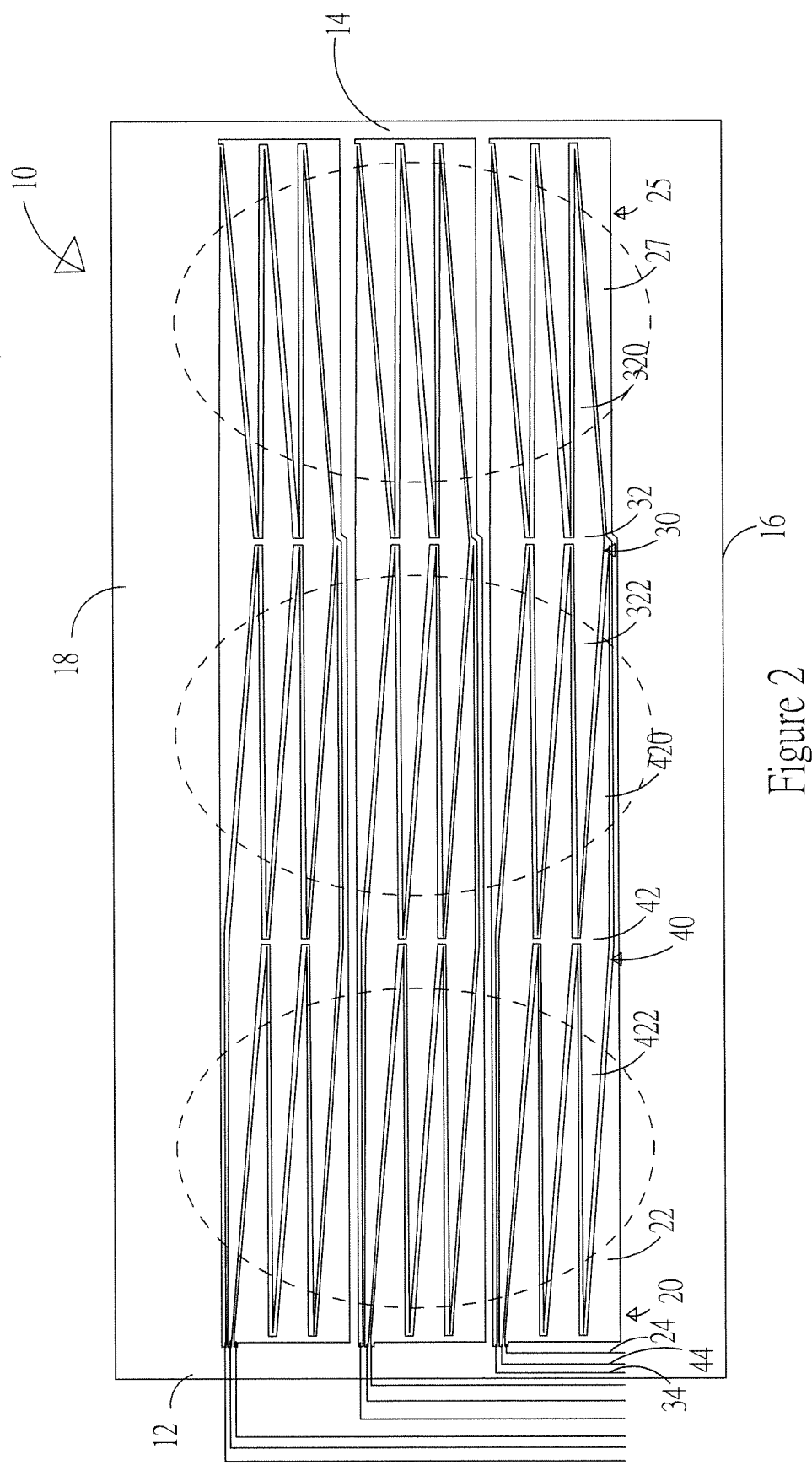
FIG. 2 shows a schematic diagram of a sensing structure of touch panel according an embodiment of the present invention.

FIG. 2 shows a schematic diagram of a sensing structure of touch panel according an embodiment of the present invention. The sensing structure of touch panel according to the present invention is a single-layer sensing structure. As shown in the figure, the sensing structure of touch panel according to the present embodiment comprises a substrate 10, a plurality of first electrode groups 20, a plurality of extended electrode groups 25, a plurality of second electrode groups 30, and a plurality of third electrode groups 40. The substrate 10 is a transparent substrate, for example, a glass substrate. The substrate 10 has a first side 12, a second side 14, a third side 16, and a fourth side 18. The first side 12 is opposite to the second side 14; the third side is opposite to the fourth side 18. The plurality of first electrode groups 20 are located on the first side 12 of the substrate 10. Each first electrode group 20 includes a plurality of first electrodes 22. Each first electrode 22 is located on the first side 12 of the substrate 10 and extends towards the second side 14. According to the present embodiment, each first electrode group 20 includes three first electrodes 22. The width of each first electrode group 20 can be designed equal to the width of an adult's finger.

The plurality of extended electrode group 25 are connected to the plurality of first electrode groups 20, respectively, and located on the second side 14 of the substrate 10. The plurality of extended electrode groups 25 correspond to the plurality of first electrode groups 20. Each extended electrode group 25 has a plurality of extending electrodes 27. Each extended electrode 25 is located on the second side 14 and extends towards the first side 12. Because, each first electrode group 20 includes three first electrodes 22 according to the present embodiment, each corresponding extended electrode group 25 also includes three extended electrodes 27 given the fact that the plurality of extended electrode groups 25 correspond to the plurality of first electrode groups 20. In addition, a first electrode 22 of the plurality of first electrode groups 20 extends, passing through the second and third electrodes 32, 42, and connects to an extended electrode 27 of the extended electrode group 25. According to the present embodiment, the first or the last first electrode 22 of each first electrode group 20 extends and connects to the corresponding first or last extended electrode 27 of the extended electrode group 25.

The plurality of second electrode groups 30 are located on the substrate 10 and have a plurality of second electrodes 32. Each second electrode 32 has a first sub-electrode 320 and a second sub-electrode 322. Each second electrode 32 is interleaved with and insulated electrically from each extended electrode 27. In other words, the first sub-electrodes 320 of the plurality of second electrodes 32 are interleaved with and insulated electrically from the plurality of extended electrodes 27. The plurality of third electrode groups 40 are located on the substrate 10 and have a plurality of third electrodes 42. Each third electrode 42 has a first sub-electrode 420 and a second sub-electrode 422. The first sub-electrode 420 of the third electrode 42 is interleaved with and insulated electrically from the second sub-electrode 322 of the second electrode 32. Besides, the second sub-electrode 422 of the third electrode 42 is interleaved with and insulated electrically from the first electrode 22. The first electrode 22, the second electrode 32, the third electrode 42, and the extended electrode 27 are triangle or trapezoid electrodes. Moreover, the plurality of first electrodes 22, second electrodes 32, third electrodes 42, and extended electrodes 27 are indium-tin-oxide thin-film electrodes.

Accordingly, the sensing structure of touch panel according to the present invention can be divided into three touch regions. The sensing and touch region of the plurality of first electrodes 22 and the plurality of second sub-electrodes 422 of the plurality of third electrodes 42 is a first touch region. The sensing and touch region of the plurality of second sub-electrodes 322 of the plurality of second electrodes 32 and the plurality of first sub-electrodes 420 of the plurality of third electrodes 42 is a second touch region. The sensing and touch region of the plurality of first sub-electrodes 320 of the plurality of second electrodes 32 and the plurality of extended electrodes 27 is a third touch region. Thereby, by using the plurality of electrodes according to the present invention, the touch frame is divided into three equal pieces and thus enhancing linearity in drawing lines.

In addition, the sensing structure of touch panel according to the present invention further comprises a plurality of first wires 24, a plurality of second wires 34, and a plurality of third wires 44. The plurality of first wires 24 are connected electrically with the plurality of first electrodes 22 of each first electrode group 20, respectively. The plurality of second wires 34 are connected electrically with the plurality of second electrodes 32 of each second electrode group 30, respectively. The plurality of third wires 44 are connected electrically with the plurality of third electrodes 42 of each third electrode group 40, respectively. Namely, the second sub-electrode 322 of the second electrode 32 extends, passing through the first and third electrodes 22, 42, and connects to the second wire 34 on the first side 12 of the substrate 10; the second sub-electrode 422 of the third electrode 42 extends, passing through the first electrodes 22, and connects to the third wire 44 on the first side 12 of the substrate 10. Because at least an extended electrode 27 of each extended electrode group 25 is connected with at least a first electrode 22 of each first electrode group 20, according to the present invention, only the plurality of first, second, and third wires 24, 34, 44 are required for dividing the touch frame into three equal pieces. Thereby, without increasing wires, a touched location on the touch panel can be known accurately and thus saving wire usage. Not only the wiring area but also the cost is reduced.

Figure 3:
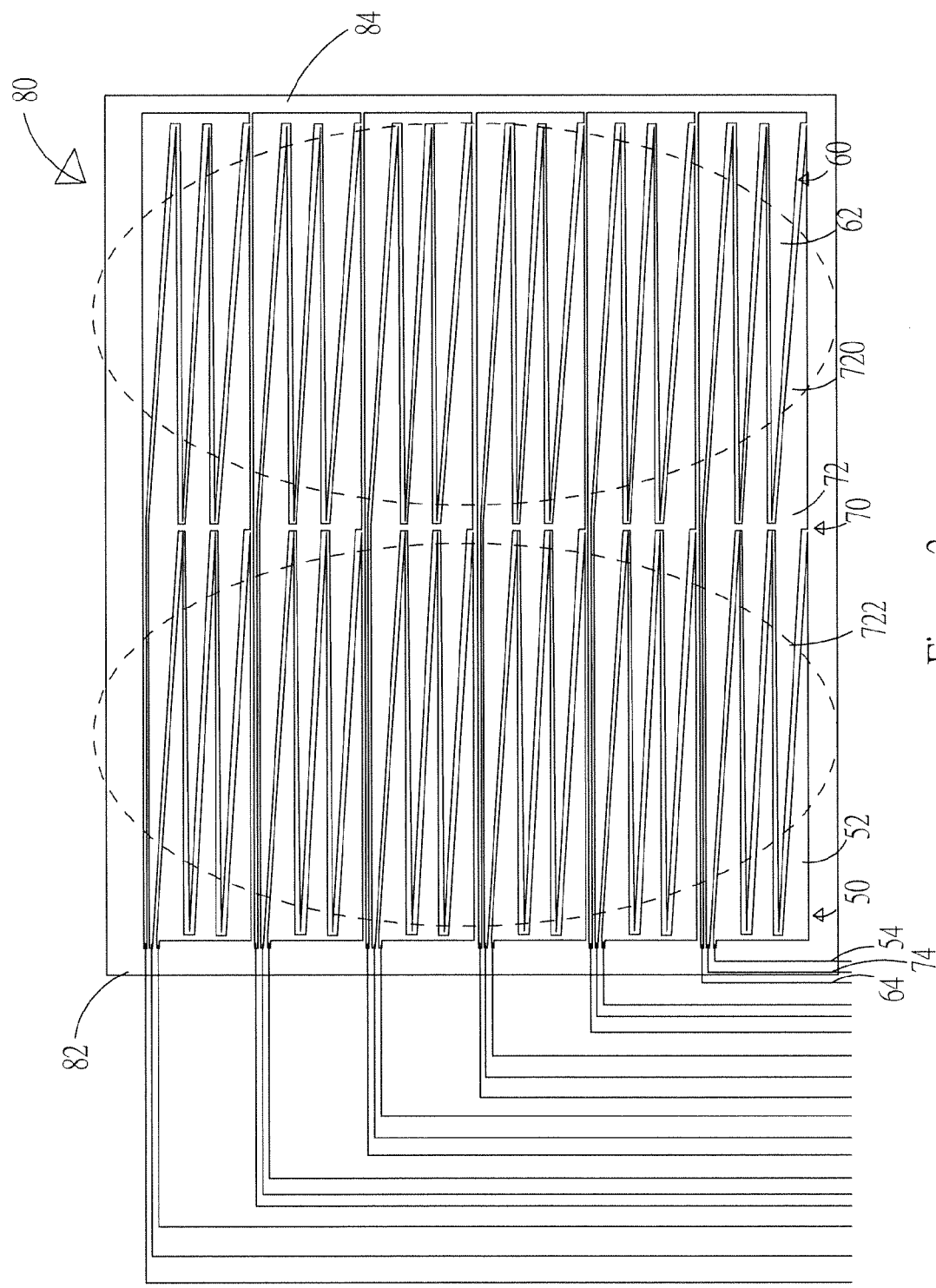
FIG. 3 shows a schematic diagram of a sensing structure of touch panel according another embodiment of the present invention.

FIG. 3 shows a schematic diagram of a sensing structure of touch panel according another embodiment of the present invention. The difference between the sensing structure of touch panel according to the present embodiment and the one according to the embodiment in FIG. 2 is that the sensing structure of touch panel according to the present embodiment includes three electrode groups but no extended electrode groups. In other words, the plurality of first, second, and third electrode groups 50, 60, 70 are all disposed on a substrate 80. The plurality of first electrode group 50 are located on a first side of the substrate 80. Each first electrode group 50 includes a plurality of first electrodes 52. Each first electrode 52 is located on the first side 82 and extends towards a second side 84. A plurality of wires 54 are connected electrically with the plurality of first electrodes of each first electrode group 50, respectively. The plurality of second electrode groups 60 are located on the second side 84 of the substrate 80. Each second electrode group 60 includes a plurality of second electrode 62. Each second electrode 62 is located on the second side 84 and extends towards the first side 82. A plurality of second wires 64 are connected electrically with the plurality of second electrodes 62 of each second electrode group 60, respectively.

The plurality of third electrode groups 70 are located on the substrate 80 and have a plurality of third electrodes 72. Each third electrode 72 has a first sub-electrode 720 and a second sub-electrode 722. The first sub-electrode 720 of the third electrode 72 is interleaved with and insulated electrically from the second electrode 62; the second sub-electrode 722 of the third electrode 72 is interleaved with and insulated electrically from the first electrode 52. The plurality of third wires 74 are connected electrically with the plurality of third electrodes of each third electrode group 70, respectively. The plurality of first, second, and third wires 54, 64, 74 are all located on the same side of the substrate 80. According to the present embodiment, the plurality of first, second, and third wires 54, 64, 74 are all located on the first side 82 of the substrate 80. Of course, they can be disposed on the second side 84 of the substrate 80. Thereby, by disposing a plurality of wires on the same side of the substrate 80, the present invention reduces the wiring area, and hence reducing the area of the touch panel.

To sum up, the sensing structure of touch panel according to the present invention comprises a substrate, a plurality of first electrode groups, a plurality of extended electrode groups, a plurality of second electrode groups, and a plurality of third electrode groups. The substrate has a first side and a second side opposite to each other. The plurality of first electrode groups are located on the first side of the substrate. Each first electrode group includes a plurality of first electrodes. The bottom of each first electrode is located on the first side and extends towards the second side. The plurality of extended electrode groups are connected to the plurality of first electrode groups, respectively, and located on the second side of the substrate. The plurality of extended electrode groups are opposite to the plurality of first electrode groups. Each extended group has a plurality of extended electrodes. The bottom of each extended electrode is located on the second side and extends towards the first side. The plurality of second electrode groups are located on the substrate and have a plurality of second electrodes. Each second electrode has a first sub-electrode and a second sub-electrode. The first sub-electrode of each second electrode is interleaved with and insulated electrically from each extended electrode. The plurality of third electrode groups are located on the substrate and have a plurality of third electrodes. Each third electrode has a first sub-electrode and a second sub-electrode. The first sub-electrode of the third electrode is interleaved with and insulated electrically from the second sub-electrode of the second electrode. In addition, the second sub-electrode of the third electrode is interleaved with and insulated electrically from the first electrode. Thereby, without increasing wires, the sensing structure of touch panel according to the present invention can give a touched location thereon accurately.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A sensing structure of touch panel, comprising:
   a substrate, having a first side and a second side opposite to each other;
   a plurality of first electrode groups, located on said first side of said substrate, each said first electrode group comprising a plurality of first electrodes, and each said first electrode located on said first side and extending towards said second side;
   a plurality of extended electrode groups, connected to said plurality of first electrode groups, respectively, located on said second side of said substrate, opposite to said plurality of first electrode groups, each said extended electrode group having a plurality of extended electrodes, and each said extended electrode located on said second side and extending towards said first side;
   a plurality of second electrode groups, located on said substrate, each said second electrode group comprising a plurality of second electrodes, each said second electrode having a first sub-electrode and a second sub-electrode, said first sub-electrode of each said second electrode interleaved with and insulated electrically from each said extended electrode; and
   a plurality of third electrode groups, located on said substrate, comprising a plurality of third electrodes, each said third electrode having a first sub-electrode and a second sub-electrode, said first sub-electrode of each said third electrode interleaved with and insulated electrically from said second sub-electrode of said second electrode, and said plurality of second sub-electrodes of said third electrode interleaved with and insulated electrically from said first electrode;
   where one of said first electrodes passes through said second and third electrodes to connect with one of said extended electrodes.

2. The sensing structure of claim 1, and further comprising:
   a plurality of first wires, connected electrically with said plurality of first electrodes of each said first electrode group, respectively;
   a plurality of second wires, connected electrically with said plurality of second electrodes of each said second electrode group, respectively; and
   a plurality of third wires, connected electrically with said plurality of third electrodes of each said third electrode group, respectively; where said plurality of first wires, said plurality of second wires, and said plurality of third wires are all located on the same side of said substrate.

3. The sensing structure of claim 2, wherein said second sub-electrode of said second electrode extends, passing through said first electrode and said third electrode, to said first side of said substrate and connects with said second wire, and said second sub-electrode of said third electrode extends, passing through said first electrode, to said first side of said substrate and connects with said third wire.

4. The sensing structure of claim 1, wherein one of said first electrodes of said plurality of first electrode groups extends, passing through said second electrode and said third electrode, and connects to one of said extended electrodes of said extended electrode group.

5. The sensing structure of claim 1, wherein said substrate is a transparent substrate, and said plurality of first electrodes, said plurality of second electrodes, and said plurality of third electrodes are indium-tin-oxide thin-film electrodes.

6. The sensing structure of claim 1, wherein said first electrode, said second electrode, and said third electrode are triangular or trapezoid electrodes.

\* \* \* \* \*